United States Patent [19]
Lowery

[11] Patent Number: 5,596,271
[45] Date of Patent: Jan. 21, 1997

[54] METHOD OF AND APPARATUS FOR DETECTING THE ROTATION RATE OF AN AIR MOVING FAN

[75] Inventor: Vernon Lowery, Brandon, Miss.

[73] Assignee: Multicraft International, Brandon, Miss.

[21] Appl. No.: 237,201

[22] Filed: May 3, 1994

[51] Int. Cl.$^6$ .................. G01B 7/14; G01P 3/44; G01P 3/487; G01R 33/06
[52] U.S. Cl. .................. 324/174; 324/235; 324/207.2
[58] Field of Search .................. 324/173, 174, 324/207.2, 207.25, 251, 235; 338/32 H

[56] References Cited

U.S. PATENT DOCUMENTS

| | | |
|---|---|---|
| 3,835,373 | 9/1974 | Matula . |
| 4,479,115 | 10/1984 | Holzhauer . |
| 4,479,419 | 10/1984 | Dawley . |
| 4,524,932 | 6/1985 | Bodziak . |
| 4,570,118 | 2/1986 | Tomczak et al. . |
| 4,667,514 | 5/1987 | Baer . |
| 4,789,826 | 12/1988 | Willett . |
| 4,970,463 | 11/1990 | Wolf et al. .................. 324/207.2 |
| 5,070,298 | 12/1991 | Honda et al. . |
| 5,084,674 | 1/1992 | Lachmann et al. . |
| 5,097,209 | 3/1992 | Santos . |
| 5,140,262 | 8/1992 | Stolfus . |
| 5,157,329 | 10/1992 | Brauer . |
| 5,159,268 | 10/1992 | Wu . |
| 5,191,284 | 3/1993 | Moretti et al. . |

FOREIGN PATENT DOCUMENTS

| | | | |
|---|---|---|---|
| 2568377 | 1/1986 | France | 324/174 |
| 56-4055 | 1/1981 | Japan | 324/174 |

*Primary Examiner*—Walter E. Snow
*Attorney, Agent, or Firm*—Wigman, Cohen, Leitner & Myers, P.C.

[57] ABSTRACT

A method and sensor for sensing the rate of rotation of a fan in order to monitor and detect a variation in the rate of air flowing through the fan, such as to indicate a restriction in the air flow path or failure of the fan. A Hall-effect transistor (HET) is placed in the fixed field of a magnet adjacent the path of a preferably ferrous moving element capable of changing the magnetic field coupled to the HET. As the ferrous element passes the magnet and HET, the strength or alignment of the field changes sufficiently to produce an output pulse from the HET. The pulse rate decreases with slowing of the fan such as may occur with a restriction or blockage in the air flow path.

21 Claims, 2 Drawing Sheets

METHOD OF AND APPARATUS FOR DETECTING THE ROTATION RATE OF AN AIR MOVING FAN

FIELD OF THE INVENTION

The present invention relates to a method of and apparatus for sensing the rate of rotation of an air-moving fan, especially a decrease in the rotation rate. More particularly, the present invention is directed to apparatus and methods for directly monitoring and detecting a variation in the rotation rate of an air-moving fan in order to indirectly monitor and measure the rate of air flowing past a point so as to indicate a restriction in an air flow path affecting the fan speed.

BACKGROUND OF THE INVENTION

It is often desirable to detect when an airflow path becomes detrimentally obstructed, such as when a filter becomes clogged or a heat exchanger becomes clogged or freezes over.

Modern automotive and other heat exchangers and air conditioners use electric fans to accelerate the airflow. A fan moving air through a clogged airflow path may suffer a short life and lead to engine damage and/or increased vehicle maintenance costs. Because such fans are often located in hard to reach locations, a failed fan for an automobile air conditioner or cooling system can significantly increase repair costs. It is therefore useful to detect and correct airflow obstructions when such problems occur and before repairs are required. The problem of determining when an airflow path becomes detrimentally obstructed has recently been addressed by placing a sensor in the air flow path and detecting when the airflow rate decreases. Sensors in previous apparatus or this purpose include electrical current sensors (a heavily loaded fan draws additional current), vane switches, pressure switches, and the like.

It is known from U.S. Pat. No. 4,479,115 to Holzhauer to provide a mechanism for automatically determining the speed of a fan, such as a fan used to cool electronic equipment, and/or to determine when the fan has failed, i.e., slowed down or stopped. Holzhauer discloses that one possible approach is to monitor the fan speed by sensing the rate at which an optical path is interrupted by the fan blades. Holzhauer also discloses that it is possible to monitor the fan speed by using a Hall effect device (such as a Hall Effect Transistor or "HET") to sense the rate at which the magnetic field created by the fan motor is rotating.

However, Holzhauer points to a significant disadvantage of the Hall effect device sensors, namely, that the HET must be installed when the fan is manufactured. The relatively heavy magnet required to trigger the HET unbalances the fan blade when added near an external HET sensor. Thus, such an arrangement is not readily retrofit or incorporated into existing installations. That is, it must be an integral part of the initial fan design and cannot, therefore, be conveniently added to existing fans or readily incorporated into existing fan designs. Moreover, stray magnetic fields are well-known to negatively affect the operation of HET sensors. The electric fan motor, of course, generates strong interfering magnetic fields in normal installations unless it is shielded.

In the typical HET, a Hall element, including a plurality of semiconductor materials of different conductivity types, is subjected to a changing magnetic field so as to deflect charge carriers in the Hall element produced by passing a current therethrough. The HET device measures the extent of charge carrier deflection and thus the flux density in terms of a variable voltage appearing between terminals at opposite ends of the Hall element. Such voltage is generally proportional to the flux density through the Hall element, and may therefore be used to measure or otherwise represent a number of different parameters which can be translated into a magnetic field. U.S. Pat. No. 3,835,373 to Matula teaches that a principal difficulty in the use of HET's to measure parameters arises because the magnetic flux density varies hyperbolically in a proportional air gap producing a non-linear relation between position and Hall element output voltage. This nonlinear relationship is highly undesirable in many measurement applications.

The Matula patent discloses a complex rotational positional sensor which utilizes a HET and a means to maintain the Hall voltage constant. The rotational position sensor includes a HET which is mounted in an air gap of variable size within a magnetic circuit. The HET is subjected to changes in magnetic flux density in direct relation to the rotational position of a cylinder member forming a part of the magnetic circuit. The magnetic circuit includes a C-shaped permanent magnet having opposite pole pieces forming air gaps with the cylindrical member. The cylindrical member comprises a half cylinder in the region of the air gap containing the HET so as to vary the effective area of the gap and thus the flux density as the cylindrical member turns. Such a system is very complex and also cannot be readily incorporated or retrofit into pre-existing fans.

U.S. Pat. No. 4,524,932 to Bodziak describes a railroad car wheel detector which utilizes a Hall effect element. The HET is incorporated into a complex integrated circuit package including temperature compensation, voltage regulation, and amplification functions. It is mounted on top of a permanent magnet which is made of ceramic material with the critical Hall axis aligned with the magnet pole axis. The combined permanent magnet and HET assembly is mounted on the rail at a predetermined distance below the top of the rails so that the flange of each passing wheel occupies the air gap between the magnet and the rail through which the major portion of the magnetic flux flows. Reduction of the air gap increases the level of the magnet flux and thus the level of voltage output of the Hall element.

U.S. Pat. No. 4,719,419 to Dawley discloses that one known apparatus for sensing precise shaft position utilizes an annular ring magnet having a plurality of circumferentially oriented poles. The ring magnet is coaxially attached to a rotary shaft and a Hall effect device is attached to a stationary member adjacent the ring magnet. In particular, the ring magnet includes a plurality of magnets connected in series to form a ring with the north and south poles of the magnets alternately arranged. As the shaft and the attached ring magnet rotate, the Hall effect device generates a sinusoidal electrical signal indicative of the magnetic induction or the magnetic flux density produced by the magnets at the Hall effect device. The polarity of the magnetic flux density and the generated electrical signal changes as each pole passes the Hall effect device. The number of signal cycles per revolution of the ring is a function of the number of poles that make up the ring. A counter counts the number of waveform cycles of the signal generated by the Hall effect device. The count is then used to determine the rotary position of the shaft. The accuracy of such a system is dependent upon the number of poles that make up the ring. That is, increasing the angular position accuracy is accomplished by increasing the number of magnets. Such a system is very complex and also cannot be readily incorporated or retrofit into pre-existing fan designs and fans.

SUMMARY OF THE INVENTION

In view of the foregoing limitations and shortcomings of the prior art devices, as well as other disadvantages not specifically mentioned above, it should be apparent that there still exists a need in the art for an effective fan rotation rate detector for detecting the presence of airflow restrictions. It is, therefore, a primary object of this invention to fulfill that need by providing an improved lightweight, inexpensive fan rotation rate sensor.

Another object of the present invention is to sense rotation rate, or a variation in the rotation rate, of motor-driven fan blades in an airflow path.

Another object of the present invention is to implement a HET-based sensor to detect the continuing rotation rate of a fan. It is intended that the detection occur without the necessity that the relatively heavy mass of a magnet be mounted on the rotating part of the fan.

Still another object of the present invention is that the sensor not require significant modification or redesign of the fan elements for incorporation into or retrofitting to an existing fan design or pre-existing fans.

An advantage arising from the novel configuration of the closely coupled magnet and HET combination in which the HET is located is that a small and lightweight interrupter element is capable of triggering the HET. Another advantage is that the presence of the magnet in close coupling with the HET isolates the HET from noise and stray magnetic field variations such as are inherently present in an automotive engine compartment.

Briefly described, the aforementioned objects are accomplished in a first embodiment of the invention by providing a fan rotation rate sensor including a lightweight magnetic field interrupter mounted to a rotating element of a fan (such as the hub of the fan), a magnet fixedly mounted to the fan relative the path of the interrupter, and a Hall effect device or transistor (HET), also fixedly mounted to the fan positioned near the magnet such that the HET is subjected to the magnetic field of the magnet. The magnetic field to which the HET is subjected varies as the interrupter closely adjoins the magnet and the HET when passing thereby during rotation of the fan. The magnet provides a field sufficient to fully turn the HET ON or OFF, until the rotating interrupter alters the magnetic field at the HET and the HET switches to the opposite state.

The method objectives of the present invention are accomplished by closely coupling a magnet and an HET and periodically passing a magnetic interrupter (or coupler) element mounted on a rotatable fan element, through a point adjacent to the magnet which is closely coupled to the HET (both being mounted to a fixed fan element) such that the magnetic interrupter (or coupler) alters significantly the field to which the HET is subjected. More particularly, the magnet is field coupled to the HET and the interrupter/coupler is attached to the fan at a point where rotation of the fan causes the interrupter/coupler to periodically alter the magnetic field to which the HET is subjected, causing an electrical output from the HET which can be measured in any of several known ways, including interval period measurement, pulse rate measurement, or signal level measurement.

Since the magnet and HET are small, and because the interrupter (or coupler) can be made of thin, relatively lightweight materials, the entire sensor can be easily retrofit into existing designs of fan motors at low cost and without retooling the fan elements.

The interrupter can be a thin strip or tab of ferrous metal, a nonmagnetic material containing magnetic or ferrous particles therein or the equivalents thereof. The interrupter may simply be adhered to the hub of the fan blade, provided it passes sufficiently close to the HET to cause a significant variation in the HET current. An interrupter/coupler element can also be made of a strip of material which has been magnetized. Two or three interrupters or couplers can be used to increase the frequency of the output pulses provided, if desired. If a plurality of interrupters or couplers are used, the number should be limited, as the advantages of a plurality of interrupters/couplers diminishes above three. Heavier sensors, and sensor elements positioned at the outer periphery of the fan blade(s) are less preferred since they inherently contribute to imbalance conditions which may be difficult to overcome.

Further, those persons of ordinary skill in the art will recognize that by placing the HET within the field of the magnet, the magnetic field of the magnet strongly affects the HET. Since the HET is thereby strongly biased magnetically, a significant change in the magnetic field is required to affect the HET sufficient to cause the HET states to switch, and thus adverse effects caused by stray and extraneous magnetic fields can be eliminated or at least significantly reduced. This arrangement advantageously provides significantly improved isolation of the sensor from extraneous signals.

The sensor is very conveniently manufactured, either by fixing the magnet and HET in a simple sheet metal frame or preferably by incorporating these elements in a molded polymeric housing. Such frame or housing may include such suitable mounting features as may be needed to attach it to the fan or fan motor hub. A connector may be provided to facilitate electrical connection to the HET.

With the foregoing and other objects, advantages, and features of the invention that will become hereinafter apparent, the nature of the invention may be more clearly understood by reference to the following detailed description of the invention, the appended claims, and to the several views illustrated in the attached drawings.

DETAILED DESCRIPTION OF THE INVENTION

Figure 1:
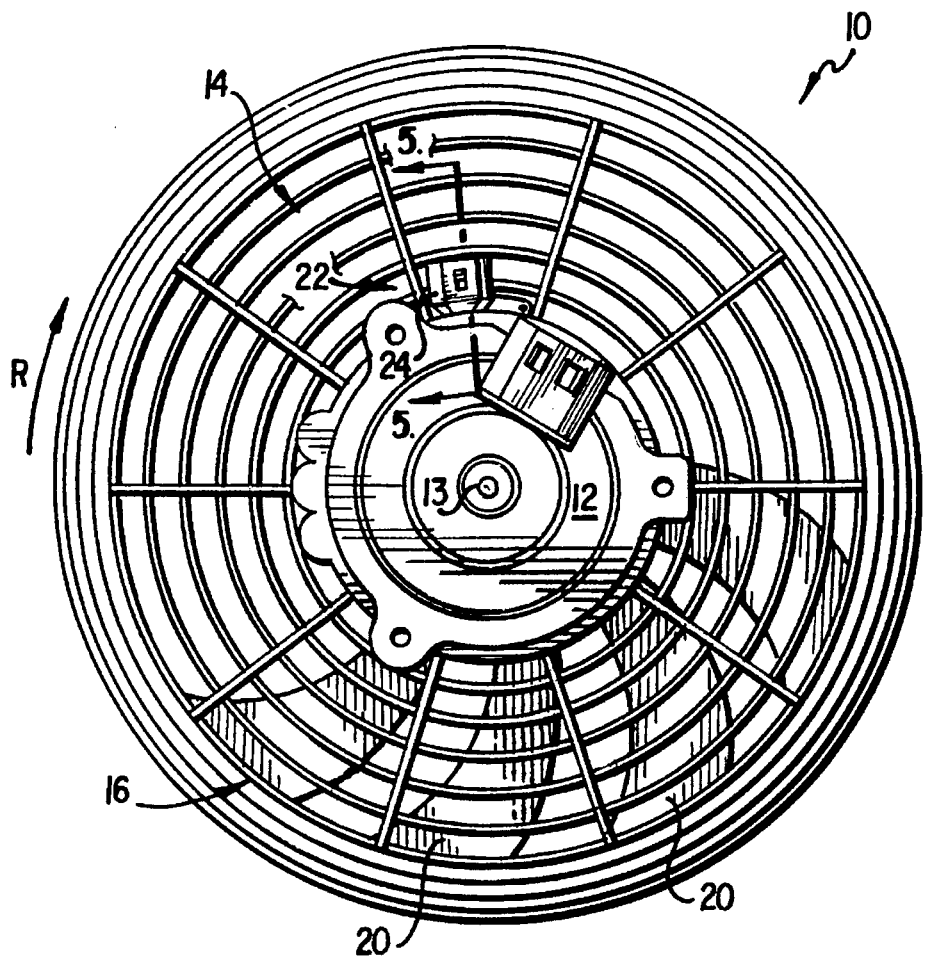
FIG. 1 illustrates a fan to be positioned in an air flow path, which incorporates a sensor unit according to one embodiment of the invention.

There is shown in FIG. 1 a fan 10, such a motor-driven vehicle fan, that may be positioned in an airflow path. A restriction in the passage of air through the fan will result through a slowing of the fan rotation rate due to an increased load on the fan motor. Failure of the fan motor or blockage of the fan blades, e.g., by ice, debris, etc., will result in a near zero or zero rotation rate.

Fan 10 includes fixed and rotating portions as is well known to those persons having ordinary skill in the art. The fixed portion includes an electric fan motor 12 centrally mounted to a fan housing 14 both of conventional construction. The rotating portions comprise the fan assembly 16 including the fan hub 18 (FIGS. 2 and 5) to which are mounted the fan blades 20. Hub 18 and blades 20 rotate in the direction shown by the arrow R about the axis 13 of fan motor 12. The fan assembly 16 is also of conventional construction and therefore need not be further described.

A sensor assembly 22 arranged to detect variations in the rotation rate of the fan comprises a rotation rate detector 24 designed to be fixedly mounted to the fan housing 14 and an interrupter element 26 (FIGS. 2 and 5) attached to a rotating portion of the fan assembly 16, such as the hub 18, as described in more detail hereinafter.

Rotation rate detector 24 shown in more detail in FIGS. 2–5, includes a magnet 28 and an HET 30, the magnet and the HET being mounted in a housing 32 affixed to a fixed portion of the fan 10. A group of electrical leads 31 extend away from HET 30 to a connector portion of the housing 32 as shown in the schematic view of FIG. 2. Housing 32 is preferably molded in one piece of a polymeric material with the magnet 28, HET 30 and electrical leads 31, being molded in situ. As the fan assembly 16 rotates around the fan axis 13, the magnetic field interrupter 26 on hub 18 passes very near the detector 24 and upsets the magnetic field to which the HET 30 is subjected by the magnet 28.

While the present invention contemplates that an interrupter 26 is preferred, it should be apparent to those persons having ordinary skill in the art that a magnetic coupler could be substituted therefor in many uses. For the purposes of this description, the term "interrupter" will be used to describe an element capable of intentionally upsetting the magnetic field of HET 30, and specifically includes such a coupler. Upsetting of the magnetic field as contemplated herein includes an increase, decrease, or change in orientation of the magnetic field at the situs of the HET 30. The magnetic field in which HET 30 lies varies substantially as the interrupter 26 passes thereby.

In order to minimize the effect of an unbalanced condition of the fan, the interrupter 26 is preferably a small piece of ferromagnetic material, such as soft steel, attached in a suitable manner to the hub 18. A small interrupter 26 is preferred so that a significant imbalance condition of the fan rotating elements is avoided. It is important that the fan rotating elements be maintained as well balanced as practicable. Two or three such interrupter elements may be used, preferably mounted on the hub 18 at equiangular intervals about the fan axis 13 so as to maintain the balance of the rotating portions of the fan assembly 16.

Figure 2:
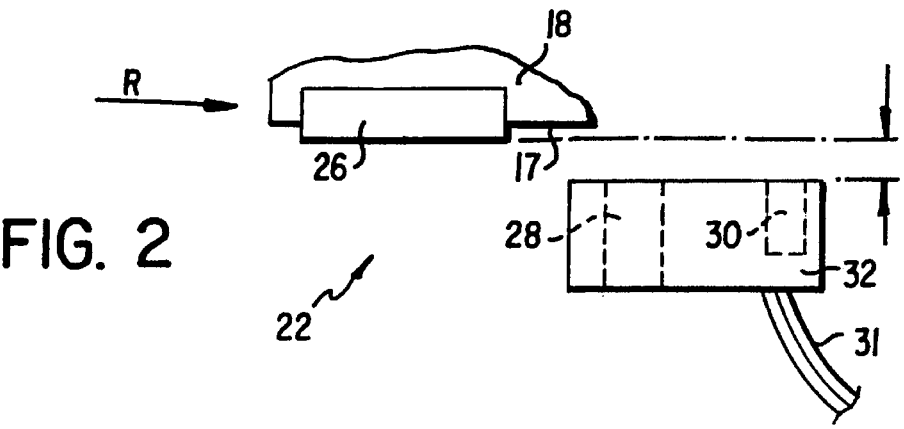
FIG. 2 is a simplified schematic diagram which illustrates the relationship of the magnet, the HET, and the magnetic field interrupter (or coupler), and shows the movement direction of the magnetic field interrupter (or coupler) element.

Interrupter 26 may comprise a clip formed of thin ferromagnetic material which is folded and crimped over the edge 17 fan hub 18 as shown in FIG. 2. The interrupter 26 may be secured with an adhesive, lightweight mechanical fastener(s), or the equivalents thereof. The interrupter is selected in size and permeability such that it does not obstruct or create significant imbalance of the fan rotating element, and such that it alters the magnetic field of the magnet 28 in the vicinity of HET 30.

In FIG. 2 magnet 28 and HET 30 are shown disposed together relative to interrupter 26 and fan hub 18 such that as the interrupter 26 passes adjacent the detector 24, it alters the field of magnet 28 in which HET 30 lies, causing the HET output to change, thereby producing an output pulse which can be detected externally and used to determine either the fan blade speed or fan operability. The present invention contemplates a steady-state voltage output, such as, for example, either ON or OFF, the state of which changes as the field to which the HET 30 is subjected is altered by the passage of the interrupter 26 past the detector 24. More particularly, the output voltage can be either a voltage pulse displaced from a common or reference potential, or a steady-state voltage which drops to a common or reference potential at the time of interruption of the field.

Figure 4:
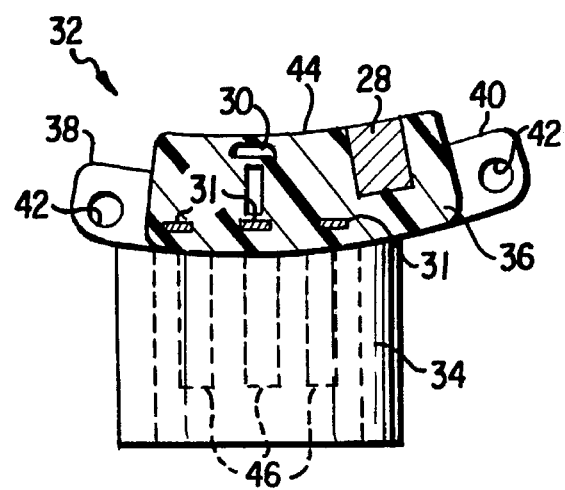
FIG. 4 is an end view partly in cross-section of a the sensor unit of FIG. 1.
Figure 3:
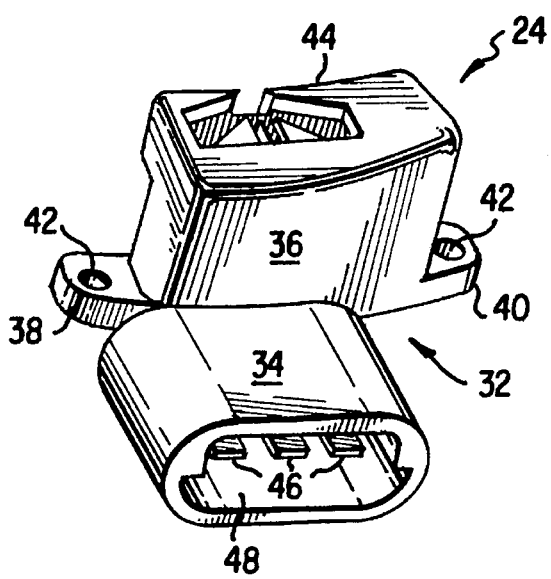
FIG. 3 is a perspective view of the sensor unit of FIG. 1.
Figure 5:
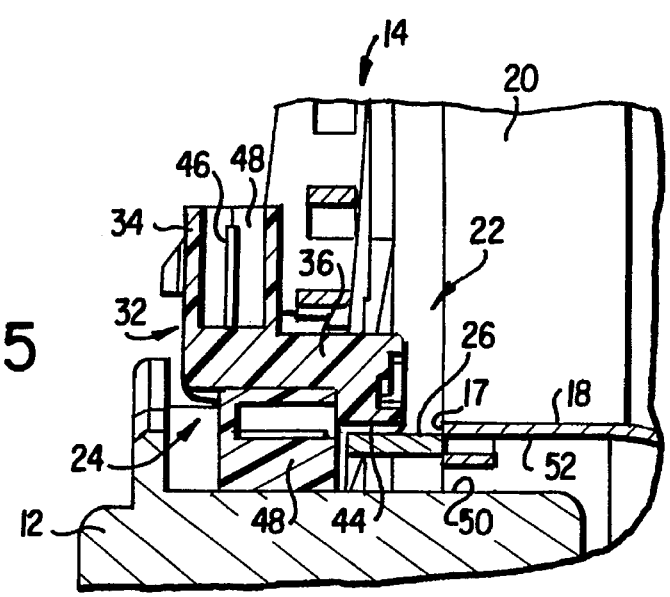
FIG. 5 is a cross-sectional view taken along line 5—5 of FIG. 1 showing the relationship of the fan housing, rotatable fan blade element, sensor unit, and interrupter according to the present invention.

Referring now to the embodiment of the invention shown in FIGS. 3–5, the molded housing 32 has a generally "L" shape comprising a first end portion 34 and a second end portion 36. Second end portion 36 is also a generally "L" shaped member as best seen in FIGS. 3 and 5. At the location where the end portions 34, 36 are joined, there is provided a pair of mounting ears 38, 40 for attaching the detector housing 32 to a fixed portion of the fan, in the described embodiment, the fan housing 14. Preferably, the ears 38, 40 are provided with holes 42 for suitable fasteners, such as screws or rivets, which are used to fasten the detector 24 to corresponding ears (not shown) on the fan housing 14. The detector may also be affixed to the fan housing by other suitable means, such as adhesives, clamps or the like.

The constructional details of the detector 24 are shown more specifically in the cross-sectional view of FIG. 4 in which second end portion 36 of housing 32 has molded integrally therein magnet 28 and HET 30 so as to position HET 30 in close proximity to curved surface 44, the radius of which is located on a common center with the fan axis 13. The HET 30 is also located in proximity to the magnet 28 so as to establish a steady-state voltage output of HET 30 as explained above. Electrical leads 46 are also molded integrally into second end portion 36 and are connected the electrical leads or terminals 31 of the HET 30 and extend into the first end portion 34 which is adapted to receive a conventional electrical connector (not shown) in cavity 48.

In lieu of molding magnet 28, HET 30, and electrical terminals 46 in situ in the housing 32, the housing 32 may be molded with appropriate recesses into which the components 28, 30 and 46 may be secured, e.g., by press-fitting, adhesives or the like.

FIG. 5 illustrates the manner in which the detector 24 and interrupter 26 are mounted to the 'fixed and rotating portions of the fan 10. The fixed portion of the fan includes the fan housing 14 which comprises a conventional annular shroud 48 to which fan motor 12 is securely fastened. The L-shaped second end portion 36 of the detector housing 32 is positioned over the shroud 48 in such manner that curved surface 44 faces the outer periphery 50 of fan motor 12. The rotatable portions of the fan comprising the fan hub 18 and fan blades 20 are connected to the fan motor shaft (not shown) along fan axis 13 (FIG. 1). Ears 38, 40 shown in FIGS. 3 and 4 are fastened to the fan housing 14 by appropriate fasteners so that the connector cavity 48 and electrical terminals 46 therein extend radially outwardly from the fan axis for ease in making the electrical connection with the detector 24. The interrupter 26 comprises a thin strip of ferromagnetic material, such as shim stock, and is fastened by adhesive bonding or other means to the inner circumferential surface 52 of the hub 18. Interrupter 26 extends beyond the edge 17 of hub 18 into close proximity with the curved surface 44 of the detector 24. The interrupter 26 is sufficiently small in size so as not to detrimentally affect the overall balance of the rotating portions of fan 10. If desired, an identical interrupter or interrupters (not shown) may be positioned on the hub 18 at equiangular spacing(s) from the location of interrupter 26 shown in FIG. 5 (e.g., 180°, 120°, etc.) to insure the fan remains balanced. Such additional interrupter(s) are only necessary when the mass of the interrupter required to operate the detector 24 is large enough to affect the balance of the fan.

The circuit for determining the fan speed from the HET 30 output pulses is not disclosed as it does not form a part of the present invention. It is noted, however, that those persons having ordinary skill in the electronic measurement and instrumentation art will be familiar with many circuits that could be used to accomplish this objective. The fan speed can be determined either by counting the number of pulses per unit of time, or by measuring the period between pulses. In the event, the fan does not rotate at all because of a failed fan motor or obstructed fan blades, e.g., by ice or debris, the input to the measuring circuit will correspond to the steady-state output of the HET 30 as described above so that those defective conditions may also be detected.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

I claim:

1. A rotation rate sensor comprising:

a member rotatable about an axis;

an interrupter fixed to the rotatable member so as to rotate therewith and define a circular path of travel upon rotation of the member;

a Hall-effect device fixedly mounted relative to and adjacent the circular path of travel of said interrupter, said Hall-effect device having a given electrical output under ambient magnetic field conditions;

a magnet having a magnetic field and being fixedly mounted in circumferentially spaced apart relation from the Hall-effect device about the axis and adjacent the circular path of travel of the interrupter such that the magnetic field of the magnet is insufficiently magnetically coupled to said Hall-effect device to cause any substantial change in the given electrical output of said Hall-effect device; and wherein said interrupter couples the magnetic field of said magnet to the Hall-effect device as it rotates on its path of travel past said magnet and Hall-effect device and causes a detectable difference in the electrical output of said Hall-effect device from the given electrical output thereof.

2. The sensor of claim 1, wherein said member is a fan element and said axis is the axis of rotation of the fan.

3. The sensor of claim 1, wherein the magnetic field of said magnet has a magnetic field axis and said Hall-effect device has a sensing axis, the magnetic field axis and the sensing axis being spaced apart along the path of travel of the interrupter and substantially parallel to one another.

4. The sensor of claim 1, wherein the magnetic field of said magnet has a magnetic field axis and said Hall-effect device has a sensing axis, the magnetic field axis and the sensing axis being arranged along respective circumferentially spaced apart radial planes through the rotational axis of said member.

5. The sensor of claim 1, wherein the interrupter is a lightweight strip of ferrous metal attached to the rotatable member.

6. The sensor of claim 1, wherein the rotatable member is a fan having a circular hub, said interrupter being fixed to said hub.

7. The sensor of claim 6, wherein the interrupter is mechanically crimped to said hub.

8. The sensor of claim 6, wherein the interrupter is adhesively affixed to said hub.

9. The sensor of claim 6, wherein the interrupter comprises a plurality of lightweight ferrous metal strips crimped or adhesively affixed to said hub in equiangularly spaced relation about the circular path of travel of the interrupter.

10. The sensor of claim 1, wherein the given electrical output of said Hall-effect device is a zero output voltage.

11. The sensor of claim 1, wherein the given electrical output of said Hall-effect device is an output voltage other than zero voltage.

12. A method of sensing the rotation rate of a member having a fixed portion and a rotating portion, comprising the steps of:

attaching to the fixed portion of the member a Hall-effect device having a given electrical output in an ambient magnetic field and a magnet such that the magnetic field of the magnet is insufficiently magnetically coupled to said Hall-effect device to cause any substantial change in the given electrical output of said Hall-effect device, said magnet and Hall-effect device being mounted in circumferentially spaced apart relation with respect to one another;

attaching an interrupter to the rotating portion of the member in such location that said interrupter rotates on a circular path of travel past said spaced apart magnet and Hall-effect device such that said interrupter couples the magnetic field of said magnet to the Hall-effect device and causes a detectable difference in the electrical output of said Hall-effect device from the given electrical output thereof; and thereafter detecting the electrical output from the Hall-effect device.

13. The method of claim 12, wherein said member is a fan and including the step of determining the rotation rate of said fan.

14. The method of claim 12, wherein said member is a fan having a hub and including the step of attaching the interrupter to said hub by mechanical crimping or by adhesive.

15. A rotation rate sensor for a heat exchanger fan in a motor vehicle comprising:

a fan element rotatable about an axis of rotation;

an interrupter fixed to the Fan element so as to rotate therewith and define a circular path of travel upon rotation of the fan element, said interrupter comprising a lightweight strip of ferrous metal;

a Hall-effect device fixedly mounted relative to and adjacent the circular path of travel of said interrupter, said Hall-effect device having a given electrical output under ambient magnetic field conditions;

a magnet having a magnetic field and being fixedly mounted in circumferentially spaced apart relation from the Hall-effect device about the axis and adjacent the circular path of travel of the interrupter such that the magnetic field of the magnet is insufficiently magnetically coupled to said Hall-effect device to cause any substantial change in the given electrical output of said Hall-effect device; and wherein said interrupter couples the magnetic field of said magnet to the Hall-effect device as it rotates on its path of travel past said magnet and Hall-effect device and causes a detectable difference in the electrical output of said Hall-effect device from the given electrical output thereof.

16. The sensor of claim 15, wherein said fan element includes fan blades forming an outer periphery of the fan element, said interrupter being located radially inwardly a substantial distance from said outer periphery toward the axis of rotation of the fan element so as to minimize the imbalance of the fan element caused by said interrupter.

17. The sensor of claim 16, wherein said lightweight strip of ferrous metal is shim stock.

18. The sensor of claim 15, wherein said fan element comprises a hub element with an edge, said lightweight strip of ferrous metal comprising a clip folded and crimped to the edge of said hub.

19. A method of retrofitting a heat exchanger fan of a motor vehicle for sensing the rotation of the fan, said fan having a fixed portion and a rotating portion, said rotating portion comprising a hub having fan blades connected thereto, said blades having an outer periphery, said method comprising the steps of:

attaching to the fixed portion of the fan a Hall-effect device having a given electrical output in an ambient magnetic field and a magnet such that the magnetic field of the magnet is insufficiently magnetically coupled to said Hall-effect device to cause any substantial change in the given electrical output of said Hall-effect device, said magnet and Hall-effect device being mounted in circumferentially spaced apart relation with respect to one another; and attaching an interrupter to the hub of the fan radially inwardly a substantial distance from said outer periphery such that said interrupter rotates on a circular path of travel past said spaced apart magnet and Hall-effect device so that said interrupter couples the magnetic field of said magnet to the Hall-effect device and causes a detectable difference in the electrical output of said Hall-effect device from the given electrical output thereof.

20. The method of claim 19, wherein said attaching step comprises mechanically crimping said interrupter to said hub.

21. A sensor for determining whether a motor vehicle fan is rotating comprising:

a fan having a hub and a plurality of fan blades having an outer periphery, said fan being rotatable about a fan axis;

a lightweight ferrous metal interrupter fixed to the hub so as to rotate therewith and define a circular path of travel upon rotation of the fan, said circular path of travel being located inwardly from said outer periphery a substantial distance to minimize the imbalance of the fan caused by said interrupter;

a Hall-effect device fixedly mounted relative to and adjacent the circular path of travel of said interrupter, said Hall-effect device having a given electrical output under ambient magnetic field conditions;

a magnet having a magnetic field and being fixedly mounted in circumferentially spaced apart relation from the Hall-effect device about the axis and adjacent the circular path of travel of the interrupter such that the magnetic field of the magnet is insufficiently magnetically coupled to said Hall-effect device to cause any substantial change in the given electrical output of said Hall-effect device; and wherein said interrupter couples the magnetic field of said magnet to the Hall-effect device as it rotates on its path of travel past said spaced apart magnet and Hall-effect device and causes a detectable difference in the electrical output of said Hall-effect device from the given electrical output thereof.

* * * * *